United States Patent
Kappler

(10) Patent No.: US 9,720,108 B2
(45) Date of Patent: Aug. 1, 2017

(54) NOISE SUPPRESSION IN THE CORRECTION OF ARTIFACTS IN CT IMAGES

(71) Applicant: Siemens Aktiengesellschaft, München (DE)

(72) Inventor: Steffen Kappler, Effeltrich (DE)

(73) Assignee: Siemens Aktiengessellschaft, Munich (DE)

( * ) Notice: Subject to any disclaimer, the term of this patent is extended or adjusted under 35 U.S.C. 154(b) by 54 days.

(21) Appl. No.: 14/956,419

(22) Filed: Dec. 2, 2015

(65) Prior Publication Data
US 2016/0171662 A1   Jun. 16, 2016

(30) Foreign Application Priority Data
Dec. 10, 2014   (DE) .................. 10 2014 225 399

(51) Int. Cl.
G06K 9/00 (2006.01)
G01T 1/24 (2006.01)
G06T 11/00 (2006.01)

(52) U.S. Cl.
CPC ............ *G01T 1/247* (2013.01); *G06T 11/005* (2013.01)

(58) Field of Classification Search
None
See application file for complete search history.

(56) References Cited

U.S. PATENT DOCUMENTS

| | | | |
|---|---|---|---|
| 2009/0122956 A1 | 5/2009 | Janssen et al. | |
| 2012/0020541 A1* | 1/2012 | Hayashida | A61B 6/583 382/132 |
| 2012/0243660 A1 | 9/2012 | Kappler et al. | |
| 2012/0326049 A1 | 12/2012 | Hannemann et al. | |

(Continued)

FOREIGN PATENT DOCUMENTS

| | | |
|---|---|---|
| DE | 102007033462 A1 | 1/2009 |
| DE | 102011006154 A1 | 8/2012 |
| DE | 102011077859 A1 | 12/2012 |

OTHER PUBLICATIONS

German Office Action mailed Nov. 24, 2015.

*Primary Examiner* — Shervin Nakhjavan
(74) *Attorney, Agent, or Firm* — Harness, Dickey & Pierce, P.L.C.

(57) ABSTRACT

A method is described for correcting a captured macropixel signal of an X-ray detector including a plurality of pixels, combined to form at least one macropixel, to capture discrete signals. A weighted macropixel signal exhibiting improved signal stability but reduced dose efficiency is determined. A variable specifying the relative signal drift of the unweighted macropixel signal compared to the weighted macropixel signal is determined on the basis of the captured macropixel signal and the weighted macropixel signal. In addition, a relative signal drift filtered with respect to time is determined on the basis of the relative signal drift. Finally, a macropixel signal corrected by the time-filtered relative signal drift is determined. A signal capture device is disclosed. Furthermore, an X-ray detector is described which includes the signal capture device according to an embodiment of the invention. A computed tomography system is also described which includes the X-ray detector.

20 Claims, 6 Drawing Sheets

(56) References Cited

U.S. PATENT DOCUMENTS

2013/0156285 A1* 6/2013 Hayashida ............ G06T 7/0012
                                                    382/132
2015/0348289 A1* 12/2015 Ida ........................ A61B 6/032
                                                    382/131

* cited by examiner

NOISE SUPPRESSION IN THE CORRECTION OF ARTIFACTS IN CT IMAGES

PRIORITY STATEMENT

The present application hereby claims priority under 35 U.S.C. §119 to German patent application number DE 102014225399.3 filed Dec. 10, 2014, the entire contents of which are hereby incorporated herein by reference.

FIELD

At least one embodiment of the invention generally relates to a method for correcting a captured macropixel signal of an X-ray detector having a plurality of pixels which are in each case combined to form at least one macropixel and in each case capture discrete signals. At least one embodiment of the invention furthermore generally relates to a method for capturing a macropixel signal of an X-ray detector having a plurality of pixels which are in each case combined to form at least one macropixel and in each case capture discrete signals. At least one embodiment of the invention additionally generally relates to a signal capture device for capturing a macropixel signal of an X-ray detector having a plurality of pixels which are in each case combined to form at least one macropixel and in each case capture discrete signals. At least one embodiment of the invention further generally relates to an X-ray detector. Finally, at least one embodiment of the invention generally relates to a computed tomography system.

BACKGROUND

Reference is made to the patent application filed under application number DE 10 2014 222 855.7, the disclosure of which is hereby incorporated herein by reference, in its entirety, into the present patent application.

In medical examinations, for example in computed tomography scans, conducted with the aid of X-rays, X-ray detectors are used as radiation detectors. These X-ray detectors can be embodied as scintillator detectors or detectors having direct converters. What is to be understood in the following as a radiation detector is any type of detector that detects radioactive radiation, though in particular captures X-rays or other hard rays, such as gamma rays, for example.

Detectors having direct converters comprise semiconductor materials which bring about a direct conversion of the radiation incident thereon into an electrical signal. The incident X-ray radiation directly generates charge carriers in the form of electron hole pairs. As a result of a voltage (bias voltage) being applied to the semiconductor material, the charge carrier pairs are separated by the electrical field generated thereby and make their way to electrical contacts or electrodes that are mounted on the semiconductor material (see FIG. 1). This causes an electrical charge pulse to be generated which is proportional to the absorbed energy and which is evaluated by a readout electronics circuit connected downstream. Semiconductor detectors utilized in the field of human medical imaging, based, for example, on CdTe or CdZnTe, have the advantage over the scintillator detectors currently in common use there that they allow counting classified according to energy level, i.e. the detected X-ray quanta can be separated as a function of their energy into, for example, two classes (high-energy and low-energy) or into a number of classes.

In the operation of semiconducting, direct-converting radiation detectors, such as CdTe- or CZT-based detectors, for example, the phenomenon of polarization occurs under irradiation by means of gamma and X-ray radiation in particular at high intensities. This expresses itself in an unwanted change in the internal electrical field in the semiconductor material of the detector. The polarization causes changes in the charge carrier transport properties, and consequently also in the detector characteristics. In particular, the cited changes lead to a change in the signal characteristics of the measured signal as a function of time. To put it another way, the polarization induces a change in the intensity of the measured signal over time at a radiation dose that remains constant. This phenomenon is also called signal drift. In computed tomography, signal drift of the detectors leads to undesirable ring artifacts. A detector is constructed from a plurality of pixels. Because the signal drift of the individual pixels is different, the detector is subject to a distribution of the signal drift factors assigned to the individual pixels. This distribution changes with time or, as the case may be, under irradiation, the width of the distribution of the signal drift factors increasing considerably more strongly than the average value of the distribution.

One possibility of reducing the signal drift resides in exploiting the fact that the width of the distribution of the signal drift factors grows more strongly than the average value of the distribution changes. In this case a plurality of detectors are combined to form groups of individual pixels, such groups being called macropixels. The macropixels can comprise, for example, a number of 2×2, 3×3 or 4×4 individual pixels. In order to reduce the signal drift, individual pixels exhibiting severe drift are excluded completely from the signal transmission. An improved drift behavior of the detector signal is achieved in this way. However, this improvement comes at the cost of quite a high deterioration in detector efficiency, i.e. a signal intensity reduced by 5% to 20% and consequently also a correspondingly degraded signal-to-noise ratio.

One approach by which the reduction in dose efficiency can be minimized is described in the application filed under application number DE 10 2014 222 855.7. With the approach, individual pixels of a macropixel that exhibit a severe drift are weighted more weakly than individual pixels exhibiting less severe drift. In order to reduce the loss in signal intensity, a function characterizing the reduction in dose efficiency is minimized in accordance with the weightings of the individual pixels. Even with this approach, however, a certain loss in detector efficiency remains, which leads to an increase in image noise in computed tomography applications.

SUMMARY

At least one embodiment of the invention resides in improving the quality of the imaging with the aid of direct-converting radiation detectors, as find application in computed tomography, for example.

At least one embodiment of the invention is directed to a method for correcting a captured macropixel signal of a radiation detector. At least one embodiment of the invention is directed to a method for capturing a macropixel signal of an X-ray detector. At least one embodiment of the invention is directed to a signal capture device. At least one embodiment of the invention is directed to a radiation detector. At least one embodiment of the invention is directed to a computed tomography system.

In the method according to at least one embodiment of the invention for correcting a captured, preferably unweighted, macropixel signal of a radiation detector, for example an X-ray detector of a computed tomography system, having a plurality of pixels which are in each case combined to form at least one macropixel and in each case capture discrete signals, a weighted macropixel signal exhibiting improved signal stability but reduced dose efficiency is determined in the first instance. The individual macropixel signals are composed of a plurality of pixel signals. During the determination of the weighted macropixel signal, the individual pixel signals are now not simply added in order to obtain a macropixel signal, but rather the individual pixel signals are assigned different weightings and the weighted pixel signals are then added to form a weighted macropixel signal. This can happen for example in such a way that pixel signals of pixels exhibiting little signal drift are weighted more heavily than pixel signals exhibiting a strongly pronounced signal drift. In this way the weighted macropixel signal is improved in terms of a minimally pronounced signal drift compared to the captured, preferably unweighted, macropixel signal.

In the method according to at least one embodiment of the invention for capturing a macropixel signal of an X-ray detector having a plurality of pixels which are in each case combined to form at least one macropixel and in each case capture discrete signals, signals of a plurality of pixels are captured in the first instance. The signals, which correspond to a radiation dose detected by the individual pixels, are combined to form a macropixel signal. In the simplest case the individual signals are simply added to produce a macropixel signal. Finally, the method according to the invention for correcting a captured macropixel signal is carried out.

The signal capture device according to at least one embodiment of the invention for capturing a macropixel signal of an X-ray detector having a plurality of pixels which are in each case combined to form at least one macropixel and in each case capture discrete signals comprises a pixel signal capture unit which is configured to detect signals of a plurality of pixels. The pixel signal capture unit can be connected for example to a plurality of pixels and can forward the signals captured by the individual pixels to other units and in addition combine them to form one, preferably unweighted, macropixel signal. The signal capture device according to the invention furthermore comprises a signal weighting unit which is configured to determine a weighted signal exhibiting improved signal stability but reduced dose efficiency. The signal weighting unit therefore determines a preferably optimized signal, improved in respect of signal drift, by taking pixel signals that are subject to a small signal drift into greater account in the composition of the weighted pixel signal than pixel signals that exhibit a more pronounced signal drift.

The radiation detector according to at least one embodiment of the invention comprises the signal capture device according to at least one embodiment of the invention.

The computed tomography system according to at least one embodiment of the invention comprises the radiation detector according to at least one embodiment of the invention.

Other particularly advantageous embodiments and developments of the invention will become apparent from the dependent claims as well as from the following description. Equally, the signal capture device according to the invention or the radiation detector according to the invention and the computed tomography system according to the invention can also be developed analogously to the dependent method-related claims.

BRIEF DESCRIPTION OF THE DRAWINGS

The invention is explained once again in more detail below on the basis of example embodiments and with reference to the attached figures. Like components in the various figures are labeled with the same reference numerals. The figures are generally not to scale. In the figures.

DETAILED DESCRIPTION OF THE EXAMPLE EMBODIMENTS

Figure 1:
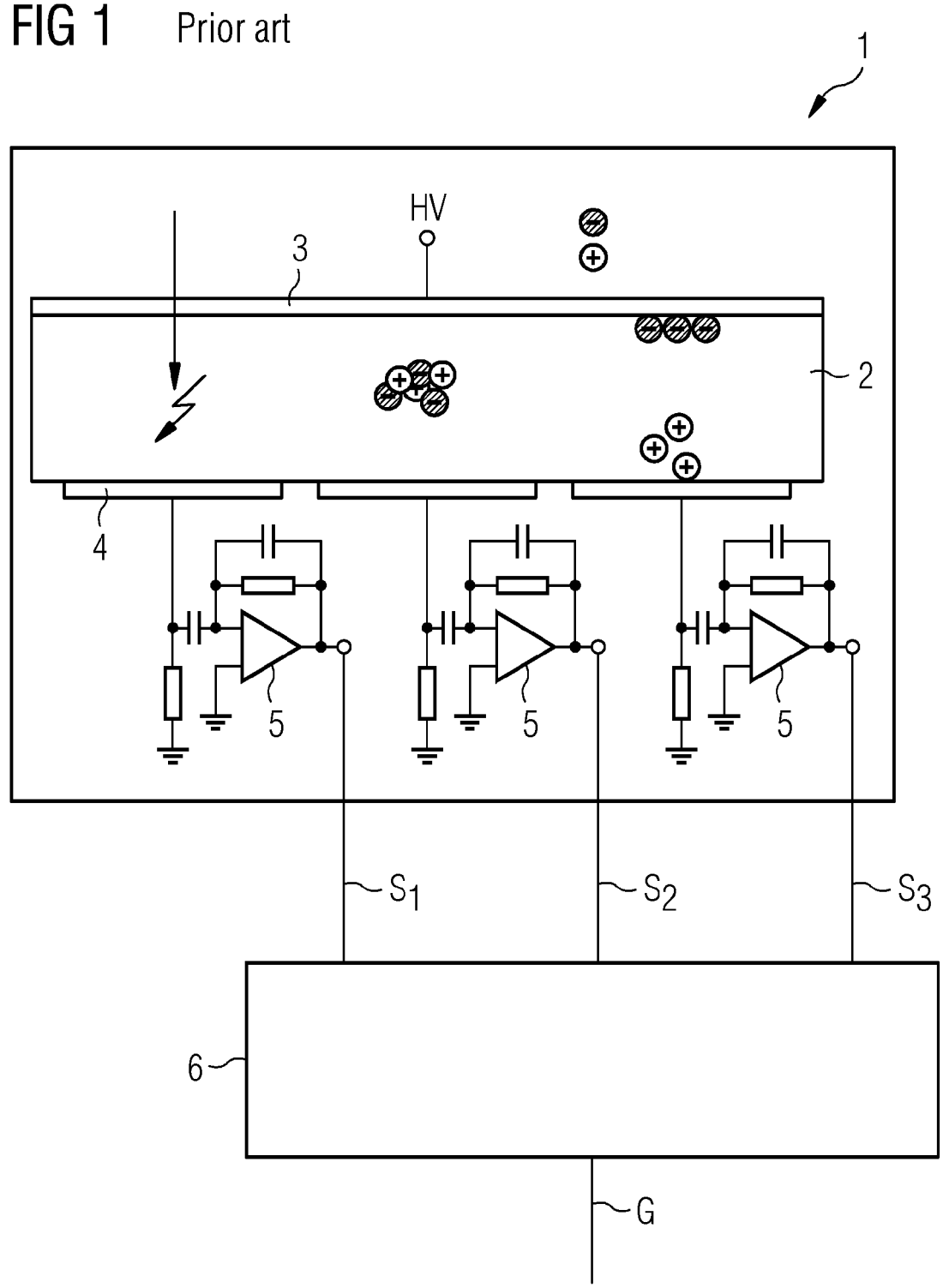
FIG. 1 schematically shows the layout of a conventional X-ray detector which is configured as a direct converter.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In the method according to at least one embodiment of the invention for correcting a captured, preferably unweighted, macropixel signal of a radiation detector, for example an X-ray detector of a computed tomography system, having a plurality of pixels which are in each case combined to form at least one macropixel and in each case capture discrete signals, a weighted macropixel signal exhibiting improved signal stability but reduced dose efficiency is determined in the first instance. The individual macropixel signals are composed of a plurality of pixel signals. During the determination of the weighted macropixel signal, the individual pixel signals are now not simply added in order to obtain a macropixel signal, but rather the individual pixel signals are assigned different weightings and the weighted pixel signals are then added to form a weighted macropixel signal. This can happen for example in such a way that pixel signals of pixels exhibiting little signal drift are weighted more heavily than pixel signals exhibiting a strongly pronounced signal drift. In this way the weighted macropixel signal is improved in terms of a minimally pronounced signal drift compared to the captured, preferably unweighted, macropixel signal.

However, the signal strength of the weighted macropixel signal is reduced on account of the weighting of the individual pixel signals. The captured, preferably unweighted, macropixel signal, on the other hand, presents itself in the simplest case simply as a sum of a number of pixel signals assigned to the macropixel. On the basis of the captured macropixel signal and the weighted macropixel signal, a variable specifying the relative signal drift of the unweighted macropixel signal compared to the weighted macropixel signal is now determined. To put it another way, a relative drift behavior of the captured macropixel signal is determined from the observation of the variation with time of the captured macropixel signal compared to the weighted macropixel signal configured for low drift. The determined relative drift behavior is typically subject to a strong variability with respect to time caused by noise phenomena. In order to suppress this interfering noise effect, a relative signal drift filtered with respect to time and so less degraded by noise effects is determined on the basis of the determined relative signal drift.

Finally, a macropixel signal corrected by the time-filtered relative signal drift is determined. In other words, the captured macropixel signal is therefore corrected in respect of its signal drift through recourse to a signal configured by appropriate weighting to exhibit small signal drift, the problem of a poorer signal-to-noise ratio occurring more intensively due to the low dose efficiency of the weighted signal being resolved by filtering a variable determining the relative drift of the captured macropixel signal with respect to time.

In the method according to at least one embodiment of the invention for capturing a macropixel signal of an X-ray detector having a plurality of pixels which are in each case combined to form at least one macropixel and in each case capture discrete signals, signals of a plurality of pixels are captured in the first instance. The signals, which correspond to a radiation dose detected by the individual pixels, are combined to form a macropixel signal. In the simplest case the individual signals are simply added to produce a macropixel signal. Finally, the method according to the invention for correcting a captured macropixel signal is carried out.

The signal capture device according to at least one embodiment of the invention for capturing a macropixel signal of an X-ray detector having a plurality of pixels which are in each case combined to form at least one macropixel and in each case capture discrete signals comprises a pixel signal capture unit which is configured to detect signals of a plurality of pixels. The pixel signal capture unit can be connected for example to a plurality of pixels and can forward the signals captured by the individual pixels to other units and in addition combine them to form one, preferably unweighted, macropixel signal. The signal capture device according to the invention furthermore comprises a signal weighting unit which is configured to determine a weighted signal exhibiting improved signal stability but reduced dose efficiency. The signal weighting unit therefore determines a preferably optimized signal, improved in respect of signal drift, by taking pixel signals that are subject to a small signal drift into greater account in the composition of the weighted pixel signal than pixel signals that exhibit a more pronounced signal drift.

The signal capture device according to at least one embodiment of the invention further comprises a signal drift determination unit which is configured to determine a variable specifying the relative signal drift of the unweighted macropixel signal compared to the weighted macropixel signal. The cited variable can be determined for example by forming a quotient from the captured macropixel signal and the weighted macropixel signal.

The signal capture device according to at least one embodiment of the invention additionally comprises a filter unit which is configured to determine a time-filtered relative signal drift on the basis of the relative signal drift. The filter unit therefore serves to reduce or, ideally, eliminate the noise of the relative drift caused by the lower dose efficiency of the weighted macropixel signal. The filtering with respect to time can be accomplished for example with the aid of a lowpass filter.

Finally, the signal capture device according to at least one embodiment of the invention comprises a signal correction unit which is configured to determine a macropixel signal corrected by the time-filtered relative signal drift. The correction of the macropixel signal is realized for example by division of the captured, preferably unweighted, macropixel signal by the time-filtered relative signal drift.

The radiation detector according to at least one embodiment of the invention comprises the signal capture device according to at least one embodiment of the invention.

The computed tomography system according to at least one embodiment of the invention comprises the radiation detector according to at least one embodiment of the invention.

Most of the above-cited components of the signal capture device according to at least one embodiment of the invention, in particular the signal weighting unit, the signal drift determination unit, the filter unit and the signal correction unit, can be realized wholly or in part in the form of software modules in a processor of the signal capture device or a corresponding control device. This is advantageous in the respect that already existing control devices can also be upgraded by means of a software installation in order to perform the method according to the invention. The invention therefore also comprises a computer program product which can be loaded directly into a processor of a computed tomography system and has program code segments for performing all of the steps of the methods according to at least one embodiment of the invention (including according to the aspects described further below) when the program product is executed on the computed tomography system.

Other particularly advantageous embodiments and developments of the invention will become apparent from the dependent claims as well as from the following description. Equally, the signal capture device according to the invention or the radiation detector according to the invention and the computed tomography system according to the invention can also be developed analogously to the dependent method-related claims.

In a preferred embodiment of the method according to at least one embodiment of the invention for correcting a captured macropixel signal of a radiation detector, preferably an X-ray detector, the captured macropixel signal is an unweighted macropixel signal. To put it another way, with this variant the captured macropixel signal is formed by simple adding of the individual signals of the pixel elements which are assigned to a macropixel. The captured, unweighted macropixel signal has the full signal strength and is therefore optimized insofar as the dose efficiency is concerned.

In a variant of the method according to at least one embodiment of the invention for correcting a captured macropixel signal, the time-filtered relative signal drift is determined by means of a filtering of the relative signal drift with respect to time with the aid of a lowpass filter. In other words, the deviation with respect to time of the captured macropixel signal from the weighted macropixel signal, which deviation is typically detrimentally affected by noise effects, is smoothed by means of integration over time.

In an alternative embodiment of the method according to at least one embodiment of the invention for correcting a captured macropixel signal, the relative signal drift is determined from the quotient of the captured macropixel signal and the weighted macropixel signal. To put it another way, the relative signal drift is yielded from the variation with time of the quotient from the captured macropixel signal and the weighted macropixel signal.

In a further alternative variant of the method according to at least one embodiment of the invention for correcting a captured macropixel signal, the relative signal drift is determined from the quotient of the captured macropixel signal normalized by the sum of the geometric efficiencies of all of the detector pixels assigned to a macropixel and the weighted macropixel signal normalized in respect of the geometric efficiency and its weightings. Expressed as a formula, the relative signal drift $f_{rsd}$ of a macropixel is yielded as:

$$f_{rsd} = \frac{U \cdot \sum_{i=1}^{l} w_i \cdot e_i}{G \cdot \sum_{i=1}^{l} e_i}, \quad (1)$$

where U is the preferably unweighted captured macropixel signal, G is the weighted macropixel signal, l is the number of pixels per macropixel, $e_i$ represents the geometric efficiency of the individual pixels, and $w_i$ specifies the weights assigned to the individual signals of the weighted macropixel signal.

The weightings $w_i$ can be specified for example by an experienced user on the basis of empirical values. The empirical values may have been obtained experimentally, for example.

In a particularly effective embodiment of the method according to the invention for correcting a captured macropixel signal, the weightings of the individual pixel signals assigned to the weighted macropixel signal are determined taking into account a function factoring in the signal drift and optionally also the dose usage (or the SNR) of the resulting macropixel signal in accordance with the weightings of the pixel signals.

Particularly preferably, the function determining the signal drift and optionally also the dose usage of the resulting macropixel signal is optimized during the determination of the weightings of the individual pixel signals. In this embodiment, a reduction in dose efficiency is therefore minimized, resulting in a macropixel signal having improved signal strength and an improved signal-to-noise ratio already prior to the correction according to the invention.

In concrete terms, the function factoring in both the signal drift and the dose usage (or the SNR) of the resulting macropixel signal can be expressed as:

$$f(w_i) = \lambda \left( \frac{\sum_{i=1}^{l} d_i \cdot e_i \cdot w_i}{\sum_{i=1}^{l} e_i \cdot w_i} - t \right)^2 + \left( \frac{\sqrt{\sum_{i=1}^{l} e_i \cdot w_i^2}}{\sum_{i=1}^{l} e_i \cdot w_i} \cdot \sqrt{\sum_{i=1}^{l} e_i} - 1 \right)^2, \quad (2)$$

where $e_i$ specifies the geometric efficiency and $d_i$ is the signal drift factor of the individual pixel signals. The parameter t represents the target drift value of the macropixel signal and $\lambda$ sets the compromise between signal drift and dose usage (or SNR) of the resulting macropixel signal. The weightings to be determined for the individual pixel signals are represented by $w_i$. The variable l specifies the number of individual pixels per macropixel.

In a particularly preferred embodiment of the signal capture device according to the invention, the device comprises an optimization unit for determining the weightings assigned to the weighted macropixel signal for the individual pixel signals taking into account a function factoring in the signal drift and optionally also the dose usage (or the SNR) of the resulting macropixel signal. In the optimization device, an optimization of the weightings of the pixel signals can be performed for example by minimizing the function described according to equation 2. In this way a weighted macropixel signal is generated which represents a compromise between signal drift and dose usage (or SNR) of the resulting macropixel signal, which weighted macropixel signal is used as a basis for determining a corrected macropixel signal exhibiting improved dose efficiency.

In a particularly practical embodiment of the X-ray detector according to the invention, the macropixels comprise a group of 4, 9 or 16 individual pixels.

FIG. 1 shows a cross-section through a conventional semiconductor detector 1 operating as a direct converter. Such a detector 1 is used for example in a computed tomography system. The semiconductor detector 1 is embodied as a planar pixel detector. It comprises semiconductor material 2 in the form of a monocrystal as detector material. The semiconductor material is covered on one side with a metal surface that forms an electrical backside contact 3. A voltage HV is present at the backside contact 3.

The opposite side of the monocrystal 2 is coated with a patterned metallization, the individual subareas of which are embodied as pixel contacts 4 and which in their entirety form a pixel array. The size and the spacings of the pixel contacts 4 determine together with further material parameters of the semiconductor material 2 the maximum spatial resolution capacity of the detector 1. The resolution typically lies in the range from 10 to 500 μm. The individual pixel contacts 4 are connected in each case to separate readout electronics circuits 5 by means of which measured signals $s_1$, $s_2$, $s_3$ are detected. The detector further comprises an addition element 6 by means of which the measured signals $s_1$, $s_2$, $s_3$ are combined to form a macropixel signal U. The addition element can also carry out a weighting of the individual measured signals or pixel signals before it adds the same. As already mentioned, this weighting results in a loss in detector efficiency.

It is noted that the arrangement 1 in FIG. 1 is shown as a cross-section and therefore the arrangement 1 in FIG. 1 comprises 9 pixel contacts in total. For greater clarity of illustration, only 3 pixel contacts per macropixel are depicted in the drawing, corresponding to the cross-sectional view. As already mentioned, 4, 16 or a different number of pixel contacts per macropixel are also common.

The detector 1 shown in FIG. 1 operates as follows: X-ray radiation incident on the detector 1 induces interactions between the X-ray quanta and the semiconductor material 2 of the detector 1, electron hole pairs being generated in the process. The voltage HV applied to the contacts of the detector generates an electrical field which moves the generated charge carriers toward the electrical contacts, in particular toward the pixel contacts 4. The charge concentration at the electrodes or pixel contacts 4 of the detector 1 generates an electrical charge pulse that is proportional to the absorbed energy of the X-ray radiation. The charge pulse is read out by the connected readout electronics 5. The pixel signals $s_1$, $s_2$, $s_3$ detected by the readout electronics 5 are forwarded to an addition unit 6 which combines the measured signals $s_1$, $s_2$, $s_3$ (actually the measured signals $s_1$ to $s_9$) to form a macropixel signal, for example a weighted macropixel signal G.

Figure 2:
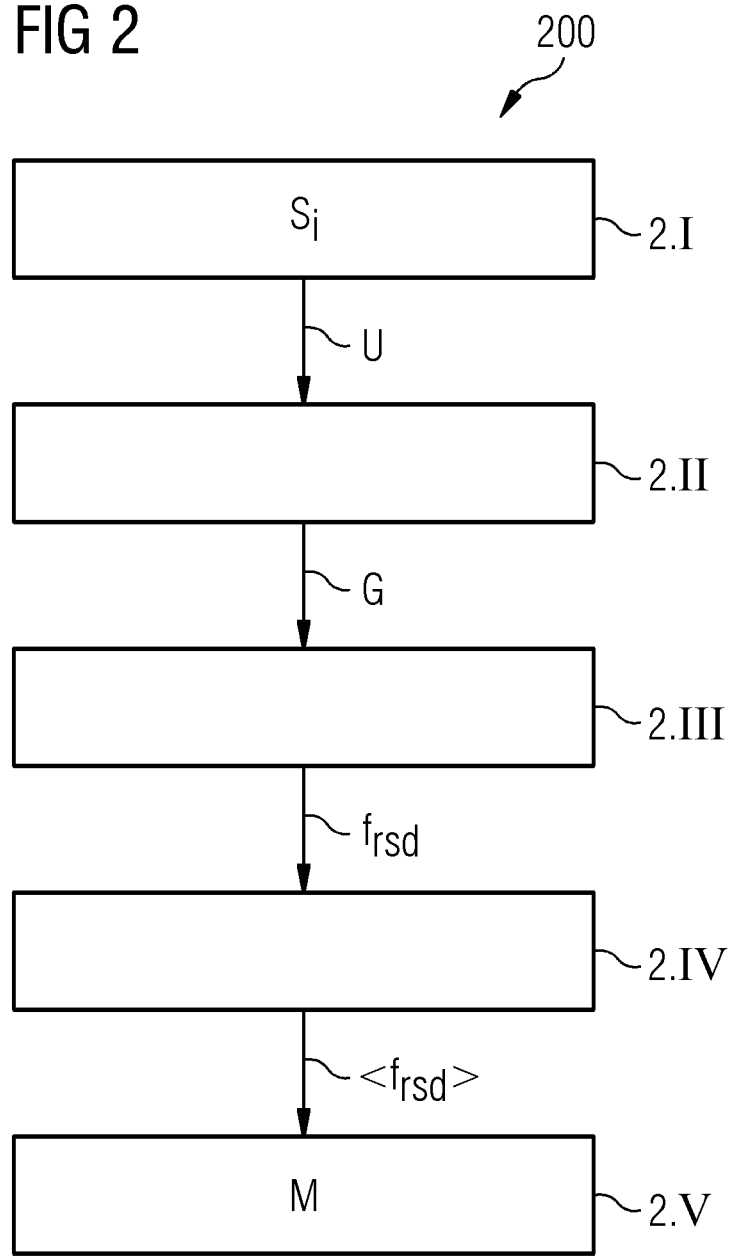
FIG. 2 is a flowchart schematically illustrating a method according to an example embodiment.

FIG. 2 shows a flowchart illustrating a method 200 for capturing and correcting a captured macropixel signal U of a radiation detector 60 (see FIG. 5) having a plurality of pixels which are in each case combined to form at least one macropixel and in each case capture discrete signals. The method can be applied for example in the capturing and evaluation of pixel signals of direct-converting detectors in sampling devices in computed tomography systems.

At step 2.I, a macropixel signal is initially determined on the basis of a number of pixel signals si of pixels assigned to a macropixel. In the actual example embodiment this happens by simple addition of the pixel signals to form an unweighted macropixel signal U.

Figure 3:
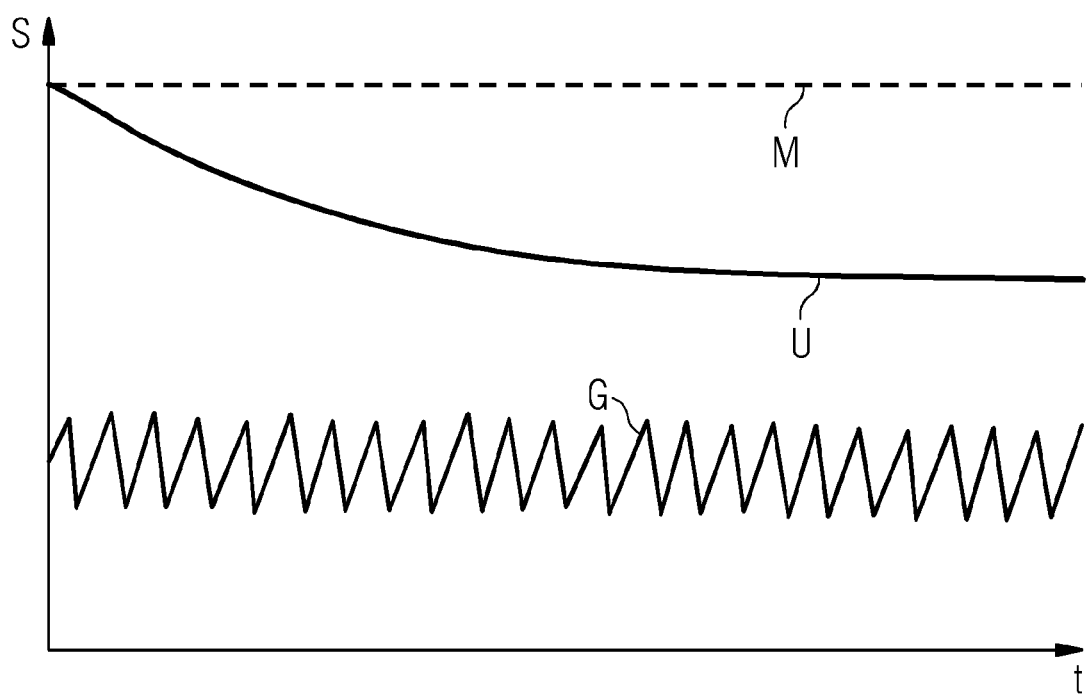
FIG. 3 shows a graph illustrating the variation with time of a captured macropixel signal, a weighted macropixel signal and a corrected macropixel signal.

At step 2.II, a weighted macropixel signal G exhibiting improved signal stability but reduced dose efficiency is determined. This can be realized for example by optimization of a function ($f(w_i)$) factoring in both the signal drift and the dose usage of the resulting macropixel signal, as is given by equation (2), and subsequent weighting of the individual pixel signals $s_i$ with the aid of the weights $w_i$ obtained in the optimization and adding of the thus weighted pixel signals. This approach is described in detail in the patent application filed under application number DE 10 2014 222 855.7. As illustrated in FIG. 3, even where an input signal of a detector remains constant, the two macrosignals U and G develop differently over time due to the stronger signal drift of the unweighted macro signal U. In the case shown in FIG. 3, the drift of the unweighted macropixel signal U expresses itself by a declining of the signal U over time.

At step 2.III, a variable is determined which specifies the relative signal drift $f_{rsd}$ of the unweighted macropixel signal U in comparison with the weighted macropixel signal G. In this example embodiment the relative signal drift $f_{rsd}$ is determined according to equation 1.

At step 2.IV, a relative signal drift $<f_{rsd}(t)>$ filtered with respect to time is determined on the basis of the relative time-dependent signal drift $f_{rsd}(t)$. For example, the time-filtered relative signal drift $<f_{rsd}(t)>$ at time instant t is yielded by the integral:

$$\langle f_{rsd}(t) \rangle = \frac{\int_{t-\frac{T}{2}}^{t+\frac{T}{2}} f_{rsd}(t^*) dt^*}{T}, \quad (3)$$

where T comprises a pre-specified integration time period which is large enough to smooth any noise effects present. As a result of the integration of the relative signal drift $f_{rsd}$ over a time interval T, the influence of any noise that is present is reduced without the risk in the process that information relating to the dynamic behavior of the relative signal drift $f_{rsd}$ would be lost, since the relative signal drift $f_{rsd}$ changes only slowly with time t. To put it another way, the integration time period T must be sufficiently short so that the signal drift changes only insignificantly during this time period. Technically, a filtering of the relative signal drift $f_{rsd}$ with respect to time can be realized for example with the aid of a lowpass filter.

At step 2.V, a macropixel signal M is determined which is corrected by the time-filtered relative signal drift $<f_{rsd}>$. The correction is effected in accordance with the following equation:

$$M = \frac{U}{\langle f_{rsd} \rangle} \quad (4)$$

Given a number of n macropixels, the method is preferably applied accordingly to all of the n macropixels.

Figure 4:
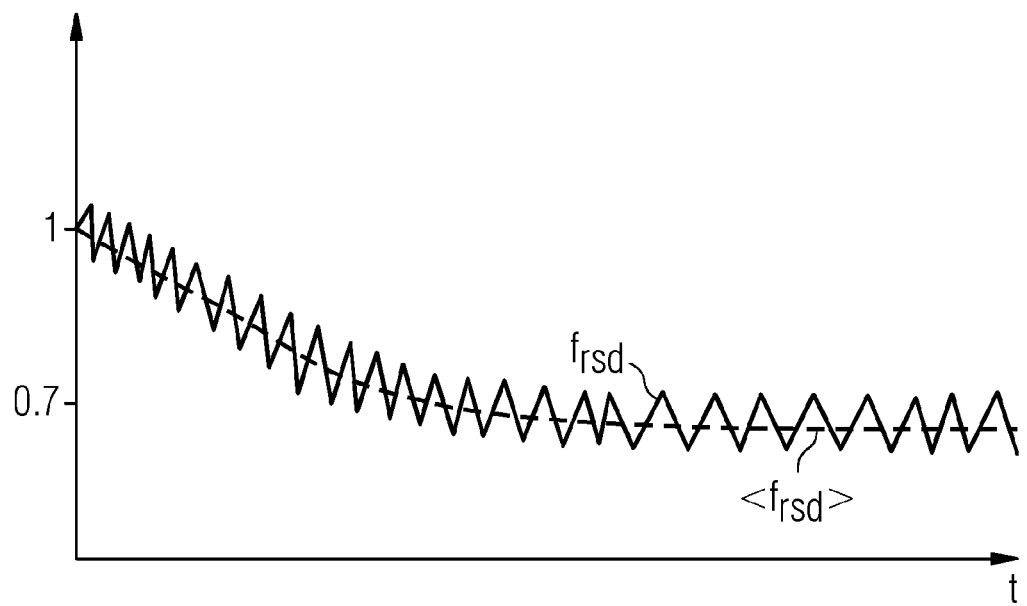
FIG. 4 shows a graph illustrating the variation with time of a relative signal drift and a time-filtered relative signal drift.

FIGS. 3 and 4 show graphs, the graph in FIG. 3 illustrating the variation with time of an unweighted macropixel signal U and a weighted macropixel signal G as well as the corresponding variation with time of a corrected macropixel signal M, and the graph in FIG. 4 showing the variation with time of the relative signal drift frsd determined by means of the method according to the invention and the time-filtered relative signal drift $<f_{rsd}>$. The relative signal drift frsd is represented schematically as a fluctuating, zigzag-shaped signal, which is intended to symbolize the influence of sources of interference occurring in a stochastically distributed manner. The time-filtered relative signal drift $<f_{rsd}>$ is represented in FIG. 4 as a dashed, largely monotonically running line. In the representation of the signals shown in FIGS. 3 and 4, a time-constant, uniform input signal that is exactly the same for all pixels is assumed for the sake of simplicity. As can be seen in FIG. 3, the weighted macropixel signal G is subject to a stronger noise due to the lower signal amplitude, which makes itself noticeable by an overlaying of the signal with a stochastically distributed noise signal. Because the relative signal drift $f_{rsd}$ is a variable that is dependent on the weighted macropixel signal G, the relative signal drift $f_{rsd}$ also exhibits the variability with time caused by the noise effect. On the other hand it is known that the actual signal drift of the unweighted macropixel signal U is a variable varying only very slowly with time. Accordingly, the actual signal drift of the unweighted macropixel signal U is very accurately reflected by the time-filtered relative signal drift $<f_{rsd}>$.

Figure 5:
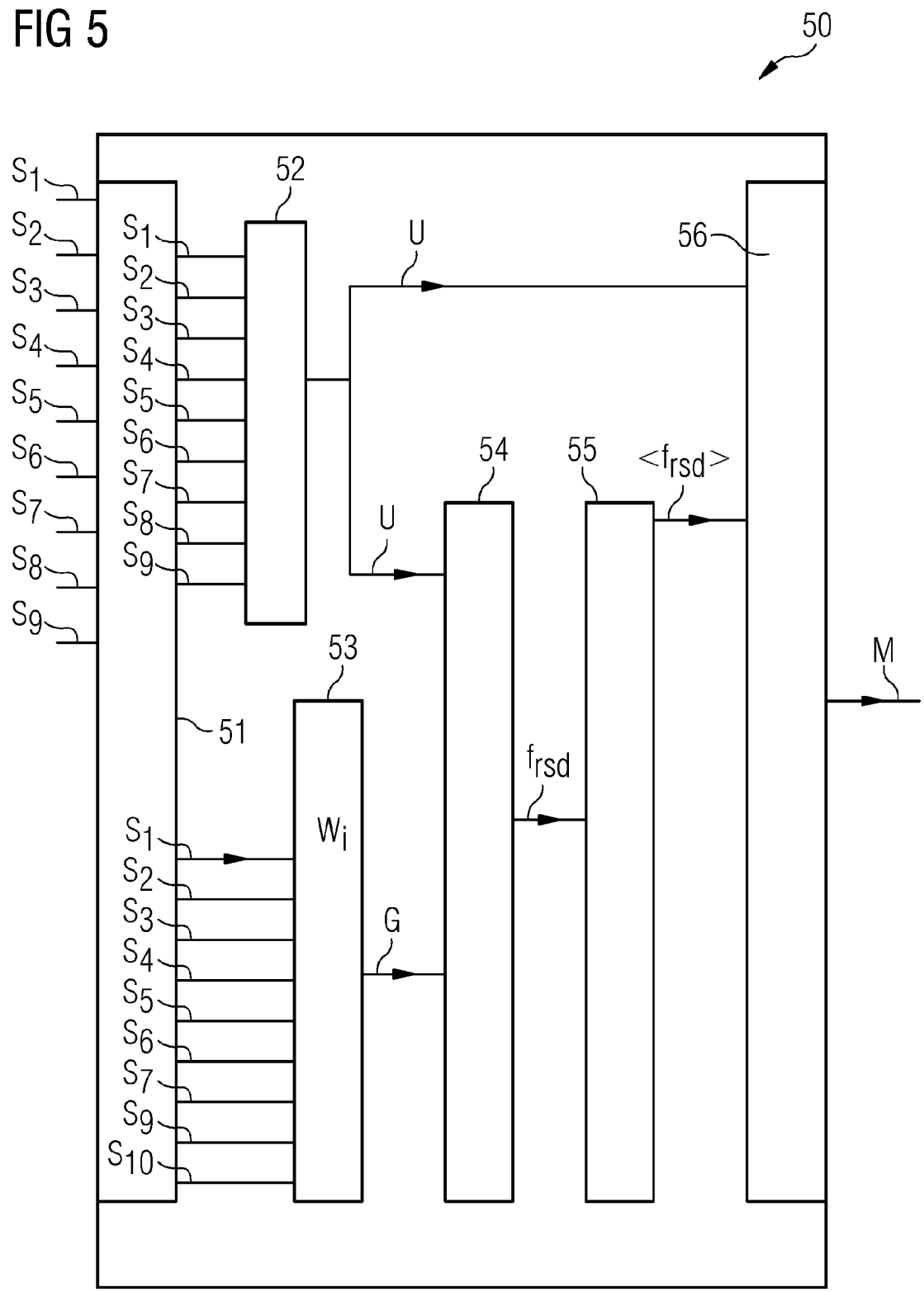
FIG. 5 is a block diagram schematically depicting the layout of a signal capture device according to an example embodiment of the invention.

FIG. 5 schematically depicts the layout of a signal capture device 50 according to an example embodiment of the invention. The signal capture device 50 is illustrated by way of example for capturing the signals of 9 pixels, which collectively form a macropixel. The signal capture device 50 comprises a signal capture unit 51 which is configured to detect signals $s_1 \ldots s_9$ of a plurality of pixels. The captured signals are transmitted by the signal capture unit 51 both to an addition unit 52, which adds the pixel signals $s_1 \ldots s_9$ to form an unweighted macropixel signal U, and to a weighting unit 53, which initially weights the pixel signals $s_9$ with weights $w_i$ and then adds the weighted signals $w_i*s_i$ to form a weighted macropixel signal G.

The addition unit 51 forwards the unweighted macropixel signal U to a signal drift determination unit 54 and to a signal correction unit 56. The signal weighting unit 53 transmits the weighted macropixel signal G likewise to the signal drift determination unit 54. The signal drift determination unit 54 determines a variable specifying the relative signal drift frsd of the unweighted macropixel signal U compared to the weighted macropixel signal G. The unweighted macropixel signal U exhibits a much stronger signal drift than the weighted macropixel signal optimized for low signal drift. Even when the dose of incident radiation remains constant, the signal drift causes a change in the ratio of the amplitudes of the weighted macropixel signal U and the weighted macropixel signal G, as can be seen in FIG. 3. Given a constant dose of incident radiation, in this case there is usually a decline in the amplitude of the unweighted macropixel signal with time due to the signal drift. In the ideal case the weighted signal is completely free of signal drift.

Due to its lower amplitude and the poorer signal-to-noise ratio associated therewith, however, the weighted macropixel signal G is subject to stochastically distributed fluctuations, as are shown in FIG. 3. The relative signal drift $f_{rsd}$ determined by the signal drift determination unit 54 is also affected by the fluctuations, also referred to in the following as noise, because the relative signal drift is a variable that is dependent on the weighted macropixel signal G (see equation 1). For this reason the relative signal drift $f_{rsd}$ determined by the signal drift determination unit 54 is transmitted to a filter unit 55 which determines a time-filtered relative signal drift $<f_{rsd}>$ on the basis of the relative signal drift $f_{rsd}$. The temporal filtering of the relative signal drift can be realized for example with the aid of a lowpass filter or lowpass circuit.

The time-filtered relative signal drift $<f_{rsd}>$ is transmitted by the filter unit 55 to the already mentioned signal correction unit 56. The signal correction unit 56, which, as already described, receives an unweighted macropixel signal U from the addition unit 52, determines a corrected macropixel signal M on the basis of the unweighted macropixel signal U and the time-filtered relative signal drift $<f_{rsd}>$. The corrected macropixel signal M is yielded from the quotient from the unweighted macropixel signal M and the time-filtered relative signal drift $<f_{rsd}>$.

An optimization unit (not shown) can also be part of the signal capture device 50 for the purpose of determining the individual pixel signal weightings that have been assigned to the weighted macropixel signal taking into account a function ($f(w_i)$) factoring in both the signal drift and the dose usage of the resulting macropixel signal in accordance with the weightings of the pixel signals. In this case the optimization unit calculates optimized weightings $w_i$ by minimizing the function represented by equation (2), the weightings $w_i$ being used by the signal weighting unit 53 for weighting the captured signals $s_1 \ldots s_9$.

Figure 6:
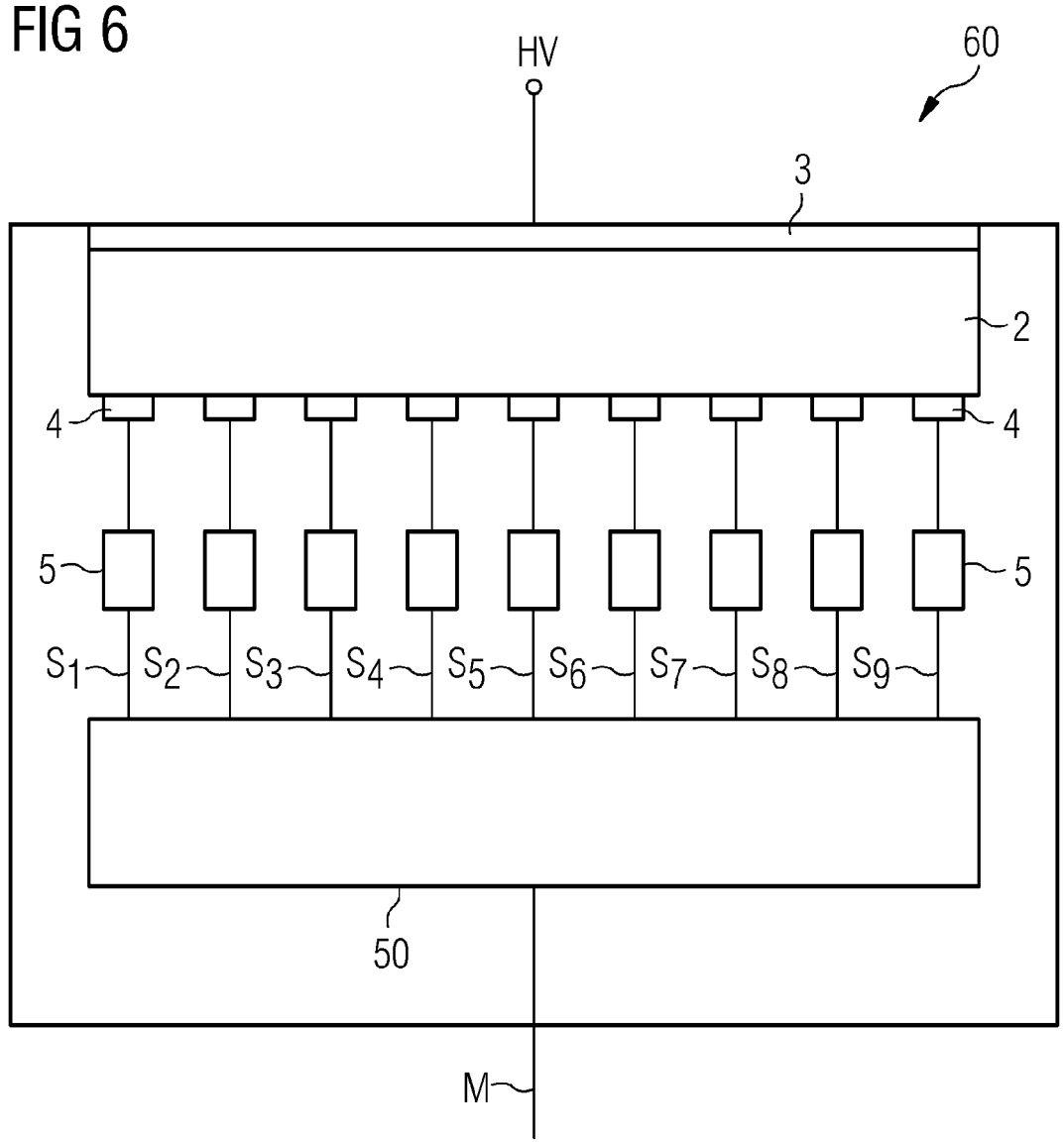
FIG. 6 shows the layout of an X-ray detector according to an example embodiment of the invention, FIG. 7 schematically shows the layout of a computed tomography system according to an example embodiment of the invention.

FIG. 6 schematically shows a radiation detector 60 according to an example embodiment of the invention having only one macropixel. The radiation detector 60 can be implemented as an X-ray detector, for example. It goes without saying that detectors in real-world applications have a plurality of macropixels. In practice, therefore, either each of the macropixels is assigned one of the described signal capture devices 50 in each case or one signal capture device 50 captures a plurality of macropixel signals by multiplexing.

The radiation detector 60 shown in FIG. 6 comprises semiconductor material 2 in the form of a monocrystal as detector material. The semiconductor material is covered on one side with a metal surface which forms an electrical backside contact 3. A voltage HV is present at the backside contact.

The opposite side of the monocrystal 2 is coated with a patterned metallization, the individual subareas of which are embodied as pixel contacts 4 and which in their entirety form a pixel array. The size and the spacings of the pixel contacts determine together with further material parameters of the semiconductor material the maximum spatial resolution capacity of the detector 1. The individual pixel contacts 4 are connected in each case to separate readout electronics circuits 5 by means of which measured signals $S_1 \ldots S_9$ are detected.

The detector 60 additionally comprises an inventive signal capture device 50 by means of which the measured signals $S_1 \ldots S_9$ are combined according to the inventive method to form a corrected macropixel signal M. The corrected macropixel signal M is then combined with other corrected macropixel signals M to yield raw data RD (not shown), assuming the detector has a plurality of macropixels.

Figure 7:
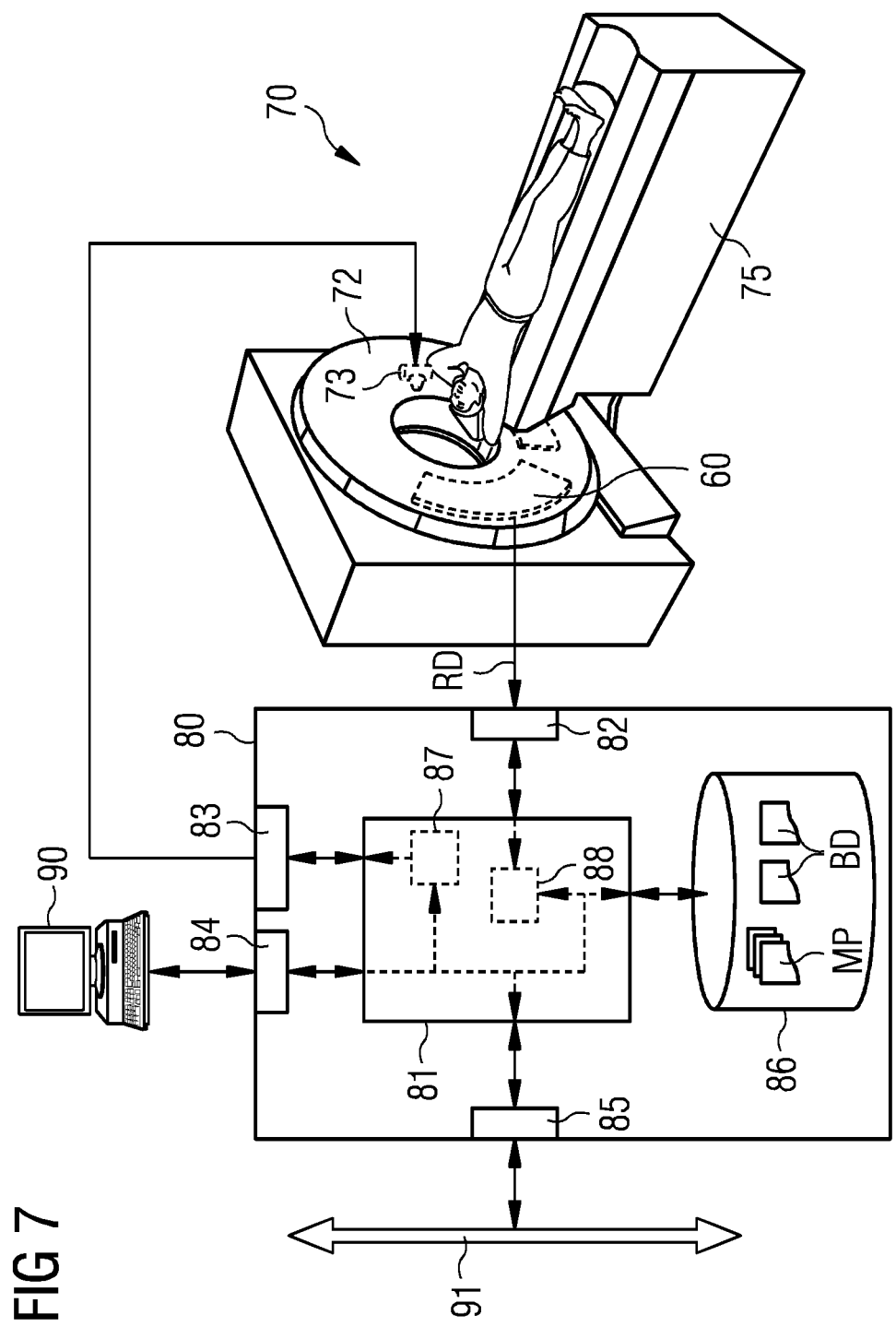

FIG. 7 shows in a roughly schematic view a computed tomography system 70 according to an example embodiment of the invention which includes the radiation detector according to the invention, in this case embodied as X-ray detector 60. The computed tomography system 70 comprises in the conventional manner a scanner 72 having a gantry in which an X-ray source 73 rotates, the latter in each case irradiating a patient that is introduced by means of a couch 75 into a measurement chamber of the gantry, such that the radiation impinges on an inventive detector 60 in each case disposed opposite the X-ray source 73. It is expressly pointed out that the example embodiment according to FIG. 7 is merely one example of a CT system and that the invention can also be used with any CT system designs, for example comprising an annular stationary X-ray detector and/or a plurality of X-ray sources. Images acquired by means of the radiation detector according to the invention exhibit no or at least less pronounced ring artifacts while at the same time image noise is suppressed.

The computed tomography system 70 also comprises a control device 80. In principle, CT systems of this type and associated control devices are known to the person skilled in the art and therefore do not need to be explained in detail.

One component of the control device 80 is in this case a processor 81 on which various components are implemented in the form of software modules. The control device 80 additionally comprises a terminal interface 84 to which is connected a terminal 90 via which an operator can operate the control device 80 and so control the computed tomography system 70. A further interface 85 is a network interface for connecting to a data bus 91 in order thereby to establish a connection to a RIS or PACS. Measurement request commands, for example, can be accepted via this bus 91 and then selected by means of the terminal 90 for a measurement that is to be performed.

The scanner 72 can be activated by the control device 80 via a control interface 83, i.e. the rotational speed of the gantry, the displacement of the patient couch 75, and the X-ray source 73 itself are controlled, for example. The raw data RD is read out from the detector 60 via an acquisition interface 82. The control device 80 additionally comprises a memory unit 86 in which different measurement protocols MP as well as other data are stored.

A measurement control unit 87 is one software component among others implemented on the processor 81. The measurement control unit 87 activates the scanner 72 via the control interface 83 on the basis of one or more selected measurement protocols MP, which, where appropriate, may have been modified by the operator by way of the terminal 90, in order to perform a measurement and acquire data.

A further component on the processor 81 is an image data reconstruction unit 88 by means of which the desired image data is reconstructed from the raw data RD obtained via the data acquisition interface 82. The reconstructed image data BD can then be stored or buffered in the memory unit 86, for example. The data can furthermore be transmitted immediately or at a later time from the memory unit 86 via the data bus 91 to diagnostic review stations, mass storage units or other output units and workstations, i.e. it can be finally be transferred to the PACS.

The subcomponents of the signal capture device 50 according to the invention are preferably installed in the detector 60. Alternatively, however, parts of the signal capture device 50, such as the addition unit 52, the signal weighting unit 53, the signal drift determination unit 54, the filter unit 55 and the signal correction unit 56, for example, can also be implemented wholly or in part in the form of software modules in a processor of the control device 80 or stored in an associated memory or on the terminal 90.

In conclusion it is pointed out once again that the methods and devices described in detail in the foregoing are example embodiments and that the basic principle can also be varied in a multiplicity of different ways by the person skilled in the art without leaving the scope of the invention, insofar as this is defined by the claims. Thus, as already mentioned, the signal capture device 50, for example, could also be implemented as part of the control device 80 of a computed tomography system 70, instead of being integrated in the detector 60, or be realized as software in a process system associated with the detector 60 or the control device 80 of a computed tomography system 70. It is also pointed out for the sake of completeness that the use of the indefinite articles "a" or "an" does not exclude the possibility that the features in question may also be present more than once. Equally, the term "unit" does not rule out the possibility that this may include of a plurality of components, which where necessary may also be spatially distributed.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for correcting a captured macropixel signal of a radiation detector including a plurality of pixels, combined to form at least one macropixel, to capture discrete signals, the method comprising:
  determining a weighted macropixel signal exhibiting improved signal stability but reduced dose efficiency;
  determining a variable specifying relative signal drift of an unweighted macropixel signal compared to the weighted macropixel signal;
  determining a time-filtered relative signal drift on the basis of the relative signal drift; and
  determining a macropixel signal corrected by the time-filtered relative signal drift.

2. The method of claim 1, wherein the captured macropixel signal is an unweighted macropixel signal.

3. The method of claim 2, wherein the time-filtered relative signal drift is determined by filtering the relative signal drift with respect to time with the aid of a lowpass filter.

4. The method of claim 2, wherein the relative signal drift is yielded from a quotient of the captured macropixel signal and the weighted macropixel signal.

5. The method of claim 1, wherein the time-filtered relative signal drift is determined by filtering the relative signal drift with respect to time with the aid of a lowpass filter.

6. The method of claim 5, wherein the relative signal drift is yielded from a quotient of the captured macropixel signal and the weighted macropixel signal.

7. The method of claim 1, wherein the relative signal drift is yielded from a quotient of the captured macropixel signal and the weighted macropixel signal.

8. The method of claim 7, wherein the relative signal drift is yielded from the quotient of the captured macropixel signal normalized in respect of a sum of the geometric efficiencies of all of the pixels assigned to a macropixel and the weighted macropixel signal normalized in respect of the sum of the products from the geometric efficiencies and weightings of the individual pixel signals.

9. The method of claim 1, wherein the weightings of the individual pixel signals assigned to the weighted macropixel signal are determined taking into account a function factoring in both the signal drift and the dose usage of the resulting macropixel signal in accordance with the weightings of the pixel signals.

10. The method of claim 1, wherein a function ($f(w_i)$) factoring in both the signal drift and the dose usage of the resulting macropixel signal is optimized.

11. The method of claim 1, wherein the function factoring in both the signal drift and the dose usage of the resulting macropixel signal (G) is expressed as:

$$f(w_i) = \lambda \left( \frac{\sum_{i=1}^{l} d_i \cdot e_i \cdot w_i}{\sum_{i=1}^{l} e_i \cdot w_i} - t \right)^2 + \left( \frac{\sqrt{\sum_{i=1}^{l} e_i \cdot w_i^2}}{\sum_{i=1}^{l} e_i \cdot w_i} \cdot \sqrt{\sum_{i=1}^{l} e_i} - 1 \right)^2$$

where $e_i$ is the geometric efficiency, $d_i$ is the signal drift factor, and t is the target drift value, $\lambda$ represents the compromise between signal drift and dose usage (or SNR) of the resulting macropixel signal, and l specifies the number of pixels which are combined to form a macropixel.

12. The method of claim 1, wherein the determining of the macropixel signal corrected by the time-filtered relative signal drift comprises a division of the captured macropixel signal by the time-filtered relative signal drift.

13. A method for capturing a macropixel signal of a radiation detector including a plurality of pixels, combined to form at least one macropixel, to capture discrete signals, the method comprising:
  capturing signals of the plurality of pixels;
  determining a macropixel signal on the basis of the captured pixel signals;
  performing the method of claim 1.

14. A non-transitory computer readable medium, directly loadable into a memory of a computed tomography system, including program code sections for the method of claim 13.

15. A non-transitory computer readable medium, directly loadable into a memory of a computed tomography system, including program code sections for the method of claim 1.

16. A signal capture device for capturing a macropixel signal of a radiation detector including a plurality of pixels, combined to form at least one macropixel, to capture discrete signals, the device comprising:
  a pixel signal capture unit, configured to detect signals of the plurality of pixels;
  a signal weighting unit, configured to determine a weighted signal exhibiting improved signal stability but reduced dose efficiency;
  a signal drift determination unit, configured to determine a variable specifying relative signal drift of an unweighted macropixel signal compared to the weighted macropixel signal;
  a filter unit, configured to determine a time-filtered relative signal drift on the basis of the relative signal drift; and
  a signal correction unit, configured to determine a macropixel signal corrected by the time-filtered relative signal drift.

17. The signal capture device of claim 16, further comprising:
  an optimization unit for determining weightings of individual pixel signals assigned to the weighted macropixel signal, taking into account a function factoring in the signal drift of the macropixel signal in accordance with the weightings of the pixel signals.

18. An X-ray detector comprising the signal capture device of claim 17.

19. An X-ray detector comprising the signal capture device of claim 16.

20. A computed tomography system comprising a radiation detector as claimed in claim 19.

* * * * *

UNITED STATES PATENT AND TRADEMARK OFFICE
CERTIFICATE OF CORRECTION

PATENT NO. : 9,720,108 B2
APPLICATION NO. : 14/956419
DATED : August 1, 2017
INVENTOR(S) : Steffen Kappler Page 1 of 1

It is certified that error appears in the above-identified patent and that said Letters Patent is hereby corrected as shown below:

On the Title Page

Item (73) should read:
(73) Assignee: SIEMENS AKTIENGESELLSCHAFT,
Munich (DE)

Signed and Sealed this
Tenth Day of April, 2018

Andrei Iancu
*Director of the United States Patent and Trademark Office*